US009052130B2

(12) United States Patent  (10) Patent No.: US 9,052,130 B2
Schlosser  (45) Date of Patent: Jun. 9, 2015

(54) LOW REFRIGERANT VOLUME CONDENSER FOR HYDROCARBON REFRIGERANT AND ICE MAKING MACHINE USING SAME

(71) Applicant: Charles E. Schlosser, Manitowoc, WI (US)

(72) Inventor: Charles E. Schlosser, Manitowoc, WI (US)

(73) Assignee: Manitowoc Foodservice Companies, LLC, Manitowoc, WI (US)

( * ) Notice: Subject to any disclaimer, the term of this patent is extended or adjusted under 35 U.S.C. 154(b) by 232 days.

(21) Appl. No.: 13/739,758

(22) Filed: Jan. 11, 2013

(65) Prior Publication Data

US 2013/0180268 A1    Jul. 18, 2013

Related U.S. Application Data

(60) Provisional application No. 61/586,593, filed on Jan. 13, 2012.

(51) Int. Cl.
*F25C 1/12*     (2006.01)
*F25B 39/04*   (2006.01)
*C09K 5/04*     (2006.01)

(52) U.S. Cl.
CPC . *F25C 1/12* (2013.01); *F25B 39/04* (2013.01); *C09K 5/042* (2013.01); *F25B 2400/12* (2013.01); *F25B 2500/01* (2013.01); *F25B 2500/221* (2013.01)

(58) Field of Classification Search
CPC ...... F25C 1/12; F25B 39/04; F25B 2500/221; F25B 2500/01; F25B 2400/12; C09K 5/042
USPC .............. 62/66, 119, 344, 320, 354, 381, 498
See application file for complete search history.

(56) References Cited

U.S. PATENT DOCUMENTS

| 5,584,186 | A | * | 12/1996 | Hirano | 62/196.4 |
| 2006/0042274 | A1 | | 3/2006 | Manole | |
| 2007/0000262 | A1 | * | 1/2007 | Ikegami et al. | 62/170 |
| 2010/0186935 | A1 | * | 7/2010 | Wand | 165/173 |
| 2010/0319393 | A1 | * | 12/2010 | Ikegami et al. | 62/500 |

FOREIGN PATENT DOCUMENTS

EP   2284460 A1   2/2011

OTHER PUBLICATIONS

International Search Report dated Mar. 19, 2013 for PCT application No. PCT/US2013/021255.
Written Opinion dated Mar. 19, 2013 for PCT application No. PCT/US2013/021255.
M.R. Hoehne & P.S. Hrnjak, ACRC TR-224, Charge Minimization in Systems and Components Using Hydrocarbons as a Refrigerant, pp. i-192, Jan. 2004, Air Conditioning and Refrigeration Center (ACRC) University of Illinois at Urbana-Champaign.†
McDonald's & United Nations Environment Programme Division of Technology, Industry and Economics (UNEP DTIE), COOL: The world's first HFC-free McDonald's restaurant: A pilot project in Vejle/Denmark, pp. 1-23, Jun. 2004, McDonald's Europe.†

* cited by examiner

*Primary Examiner* — Mohammad M Ali
(74) *Attorney, Agent, or Firm* — Ohlandt, Greeley, Ruggiero & Perle, LLP (57) ABSTRACT

An ice making machine using hydrocarbon (HC), and particularly propane, as the refrigerant is disclosed. The ice making machine has components which have been modified in size, type and operation to accommodate the use of HCs, and particularly propane, in the ice making machine refrigerant system. Also disclosed is a low volume condenser especially designed for HCs, and in particular propane, to minimize the volume of flammable/explosive HC in the ice making machine refrigerant system.

15 Claims, 5 Drawing Sheets

LOW REFRIGERANT VOLUME CONDENSER FOR HYDROCARBON REFRIGERANT AND ICE MAKING MACHINE USING SAME

CROSS-REFERENCED APPLICATION

This application claims priority to U.S. Provisional Application No. 61/586,593, filed on Jan. 13, 2012, which is incorporated herein in its entirety by reference thereto.

BACKGROUND

1. Field of the Disclosure

The present disclosure relates, in general, to ice making machines and, more particularly, to ice making machines using a hydrocarbon (HO) refrigerant, such as propane, and modified to use such HO refrigerant and in particular, utilizing a low refrigerant volume air condenser.

2. Discussion of the Background Art

Ice making machines are in widespread use for supplying cube ice in commercial operations. Typically, the ice making machines produce a large quantity of ice by flowing water over a large chilled surface. The chilled surface is thermally coupled to evaporator coils that are, in turn, coupled to a refrigeration system. The chilled plate, or evaporator, contains a large number of indentations on its surface where water flowing over the surface can collect. Typically, the indentations are formed recesses within a metal plate having high thermal conductivity. As water flows over the indentations, it freezes into ice.

To harvest the ice, the evaporator is heated by hot vapor flowing through the evaporator coils. The evaporator plate is warmed to a temperature sufficient to harvest the ice from the evaporator. Once freed from the evaporator surface, a large quantity of ice cubes are produced, which fall into an ice storage bin. The ice cubes produced by a typical ice making machine are square, rectangular or rhomboidal in shape and have a somewhat thin profile. Rather than having a three-dimensional cube shape, the ice cubes can be tile-shaped and have small height and width dimensions.

Typically, HFC-type refrigerants, such as R-404a are used in conventional ice making machines. R-404a is an HFC "nearly azeotropic" blend of 52 wt. % R-143a, 44 wt. % R-125, and 4 wt. % R-134a. It was designed as replacement for R-22 and R-502 CFC. Its boiling point at normal pressure is −46.5° C.; its liquid density is 0.485 g/cm$^3$. These HFC-type refrigerants serve the useful purpose of replacing chlorofluorocarbons (CFCs) and hydrochlorofluorocarbons (HCFCs) which were banned from use due to environmental effects. However, HFCs are not the most environmentally friendly compounds. The use of HFC-type refrigerants are themselves falling into criticism for their environmental affects, much the same as CFCs and HCFCs were banned due to environmental impact.

In light of these shortcomings in typical prior art ice making machines, it would be useful develop an ice making machine which can use more environmentally friendly and energy efficient refrigerants. It is known that HCs, such as propane, are very environmentally friendly and efficient refrigerants. However, HCs present their own set of problems; specifically they are flammable or explosive if exposed to heat, fire or spark especially in sufficient concentrations in confined spaces. Thus, the amount of HCs which can be used as refrigerants in ice making machines should be limited to avoid disastrous results in the event of an accidental ignition or explosion. Indeed, safety agencies in the USA and Canada (such as UL and CSA) are in the early stages of approving flammable refrigerants in North America. The European safety standards, IEC standards, dealing with R-290, require that the refrigerant charge be limited to 150 grams, unless special approval is sought and received. The special approval does not apply to apparatuses the size of commercial ice making machines which are to be placed in consumer locations such as restaurants, cafeterias and the like. A need exists for such an ice making machine.

Some HCs, such as propane, do find use in commercial applications, typically in Europe, where they are often used in indirect cooling/refrigeration systems. For example, HCs may be used to cool ethylene glycol and the ethylene glycol is then transported through tubing or piping to the point where the cooling/refrigeration is effected. The actual cooling apparatus using the HC in this type of application is generally located in a ventilated isolated area, away from the area of actual cooling. Special approval is either not required or is given for these applications, due to the location of the apparatuses. If a fire or explosion occurs in this instance at the source of HC, the possibility of injury to humans is reduced. In other instances, the amount of flammable refrigerant is so minimal that the danger of fire or explosion is not a serious issue.

A need exists for an ice making machine which can use environmentally friendly HCs, but also serve in applications where consumers are close at hand, thus minimizing the possibilities of injury in the event of a fire or explosion. Preferably, in fact, the need exists for an ice making machine which can use environmentally friendly HCs yet minimizes the likelihood of fire or explosion in the first instance.

Thus, It is an object to the present disclosure to provide an ice making machine which can safely utilize HCs.

It is also an object of the present disclosure to provide an ice making machine which can utilize HCs while using an amount of HC which minimizes the risk of disastrous explosion or fire.

It is a further object of the present disclosure to provide an ice making machine which can take advantage of the efficient refrigeration properties of HCs.

It is a still further object of the present disclosure, to provide an ice making machine which matches the output of conventional machines using HFC refrigerants, but at lower energy usage.

SUMMARY

The above and other objects are met through applicant's present disclosure wherein a modified ice making machine has been developed which allows the use of HCs, and in particular propane, safely and efficiently. Although propane is the preferred HC used in use the present disclosure, modifications of the disclosure to utilize other HCs, or combinations other HCs with propane, are now within the ability of those skilled in the art, based upon applicant's disclosure. For example, isobutene (R-600a) and normal butane (R-600) should be amenable for use in modifications of the disclosed system.

In one of the embodiments of the present disclosure, there is provided a low volume condenser especially designed for HCs, and in particular propane, to minimize the volume of flammable/explosive HC in the ice making machine refrigerant system. In the disclosed condenser, the volume has been kept below 200 ml. to meet certain weight limitation standards set by government regulatory agencies for R-290 (propane). Preferably, the volume of the condenser may be kept between about 100-250 ml. However, in particular applications and for particular refrigerants, somewhat larger volumes of condensers may be acceptable.

In one of its embodiments, the present disclosure comprises an ice making machine comprising a coolant/refrigerant system comprising a coolant/refrigerant, a compressor, a condenser, an evaporator, an expansion device, a hot gas valve for directing hot gases from the compressor to the evaporator, and interconnecting lines therefore, wherein the coolant/refrigerant comprises a hydrocarbon and the condenser having a total internal volume of between about 100 ml to about 250 ml, based upon the volume of first and second header and micro channels disposed therebetween.

In another one of its embodiments, the present disclosure comprises an ice making machine comprising a compressor for compressing a gas coolant/refrigerant comprised of hydrocarbon and a condenser for condensing the compressed hydrocarbon refrigerant, said condenser comprising a first and second header, an inlet port for receiving heated vaporous hydrocarbon coolant/refrigerant from said compressor, an outlet port for discharging condensed liquid hydrocarbon coolant/refrigerant, said inlet port and outlet port disposed in said first header, micro channels disposed between said inlet port and said outlet port and between said first and second header, wherein said condenser has an internal volume of between about 100 to about 250 ml, based upon the volume of first and second header and micro channels disposed therebetween.

In still another one of its embodiments, the present disclosure comprises a condenser for use in an ice making machine for condensing a compressed hydrocarbon coolant/refrigerant, said condenser comprising a first and second header, an inlet port for receiving heated vaporous hydrocarbon coolant/refrigerant from said compressor, an outlet port for discharging condensed liquid hydrocarbon coolant/refrigerant, said inlet port and outlet port disposed in said first header, micro channels disposed between said inlet port and said outlet port and between said first and second header, wherein said condenser has an internal volume in said first and second header and said micro channels between from about 100 ml to about 250 ml.

In a still further one of its embodiments, the present disclosure comprises a method of maintaining the ice making capacity while simultaneously reducing the energy use of an ice making machine, said method comprising using a condenser comprising a first and second header, an inlet port for receiving heated vaporous hydrocarbon coolant/refrigerant from said compressor, an outlet port for discharging condensed liquid hydrocarbon coolant/refrigerant, said inlet port and outlet port disposed in said first header, micro channels disposed between said inlet port and said outlet port and between said first and second header, wherein said condenser has an internal volume in said first and second header and said micro channels between from about 100 ml to about 250 ml.

In an additional embodiment of the present disclosure, there is provided an ice making machine wherein the components which could cause sparking, e.g. overload protectors, start relays, contactors and the like, are internal or sealed to prevent exposed sparking.

In a still further embodiment of the present disclosure, there is provided an ice making machine wherein the components have been modified in size, type and operation to accommodate the use of HCs, and particularly propane, in the ice making machine refrigerant system.

The disclosure will be described in more detail hereinafter with reference to a specific exemplary embodiments and reference to the accompanying drawings.

BRIEF DESCRIPTION OF THE DRAWINGS

Further details, features and advantages of this disclosure result from the following description of an embodiment using the drawings in which.

DETAILED DESCRIPTION OF THE PREFERRED EMBODIMENT

Figure 1:
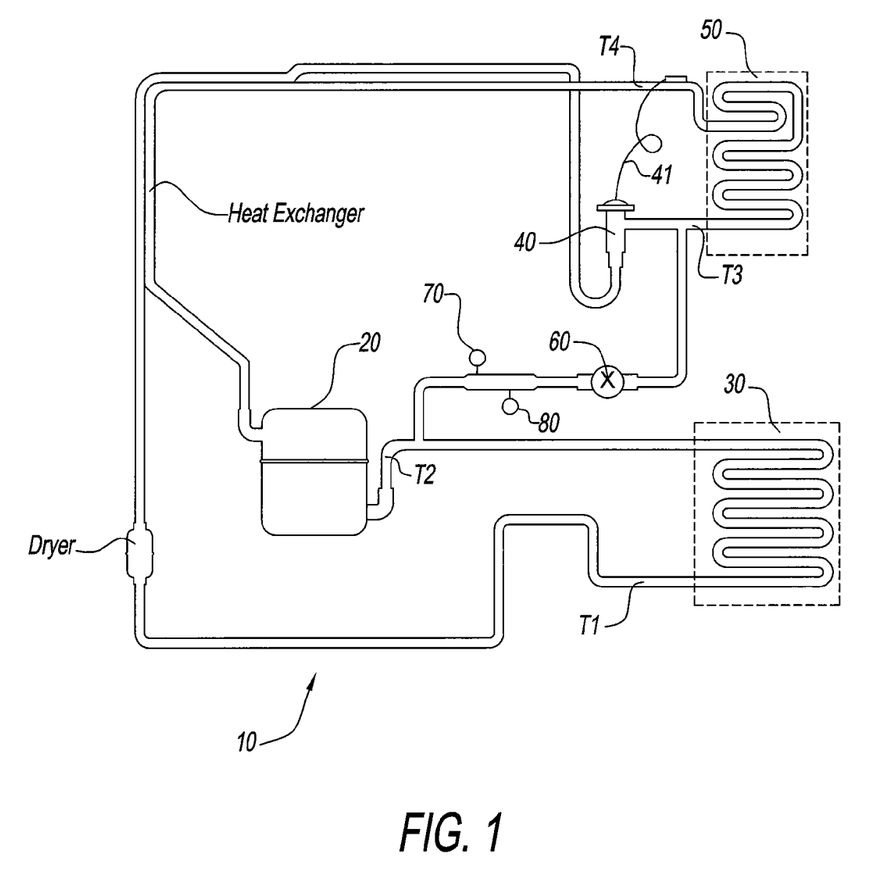
FIG. 1 is a schematic drawing of an ice machine.

FIG. 1 depicts a general flow scheme of an ice making machine such as those which are the subject of the present disclosure. In FIG. 1, there is a closed refrigerant system (10) in which there is a compressor (20) filled to an appropriate level with a suitable gas refrigerant. The compressor increases the pressure of, and thus the temperature of, the gas refrigerant. The gas refrigerant exits the compressor and is passed along, due to the compressor pressurizing the entire system, to the condenser (30) where the high pressure gas refrigerant gives up its heat and liquefies. The high pressure gas refrigerant gives up its heat through ambient heat exchange with the environment, occurring as the high pressure gas refrigerant, passes through the serpentine-like coils of the condenser. The refrigerant leaves the condenser as a high pressure liquid and passes through the system to the expansion valve (40). The expansion valve can be said to have a "condenser" side (on the side of the system where the flow of refrigerant comes from the condenser) and an "evaporator" side (on the side of the system where the flow of refrigerant goes to the evaporator). Because the high pressure liquid refrigerant is urged through the expansion valve, due to the pressure drop across the expansion valve, the liquid refrigerant immediately boils, gains heat from the evaporator (50), and cools the evaporator. At the surface of the evaporator there are located a plurality of cells (not shown) into which water flows and freezes in thin layers repeatedly, yielding ice cubes of substantially uniform dimensions. At intervals determined by electronic sensors, to prevent excessive ice build-up in the cells on the surface of the evaporator and to harvest the ice cubes, the evaporator is warmed.

In more detail, many adjustments and changes had to be made to the general ice making machine such as shown in FIG. 1 to enable the use of and HC, and in particular propane (R-290), as a refrigerant. Starting with the compressor, the compressor displacement must be increased when changing from working with an HFC refrigerant to working with and HC refrigerant such as R-290. Internal motors must be sized to handle the loads of R-290 refrigerant and yet be as energy efficient as possible. All overload protectors must be internal to prevent exposed sparks when used with HC refrigerants. All start relays must be sealed to prevent exposed sparks. In the examples which follow, through experimentation, it was found that the following compressors could be used with success in the following capacity ice making machines (Danfoss model compressor NL9CN is used in the model QYP0214A-251 (rated at 214 #/day of ice, at ambient air temperature of 70° F. and water temperature of 50° F.) ice making machine; Danfoss model compressor SC12CNX is used in the model IYP0324A-251 (rated at 324 #/day of ice, at ambient air temperature of 70° F. and water temperature of 50° F.) ice making machine; and Danfoss model compressor SC18CNX is used in the model IYP0504A-251 (rated at 504 #/day of ice, at ambient air temperature of 70° F. and water temperature of 50° F.) ice machine).

Figure 2A:
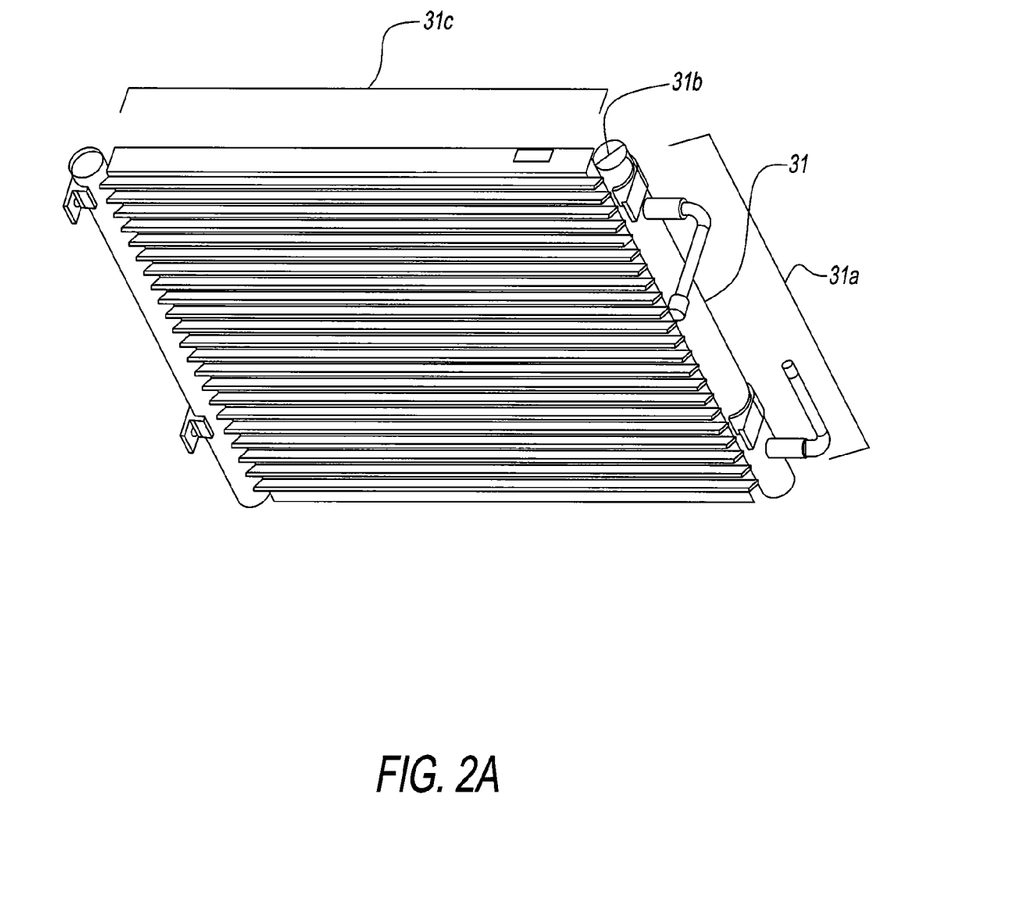
FIG. 2a is a perspective view of the condenser of the present disclosure.
Figure 2B:
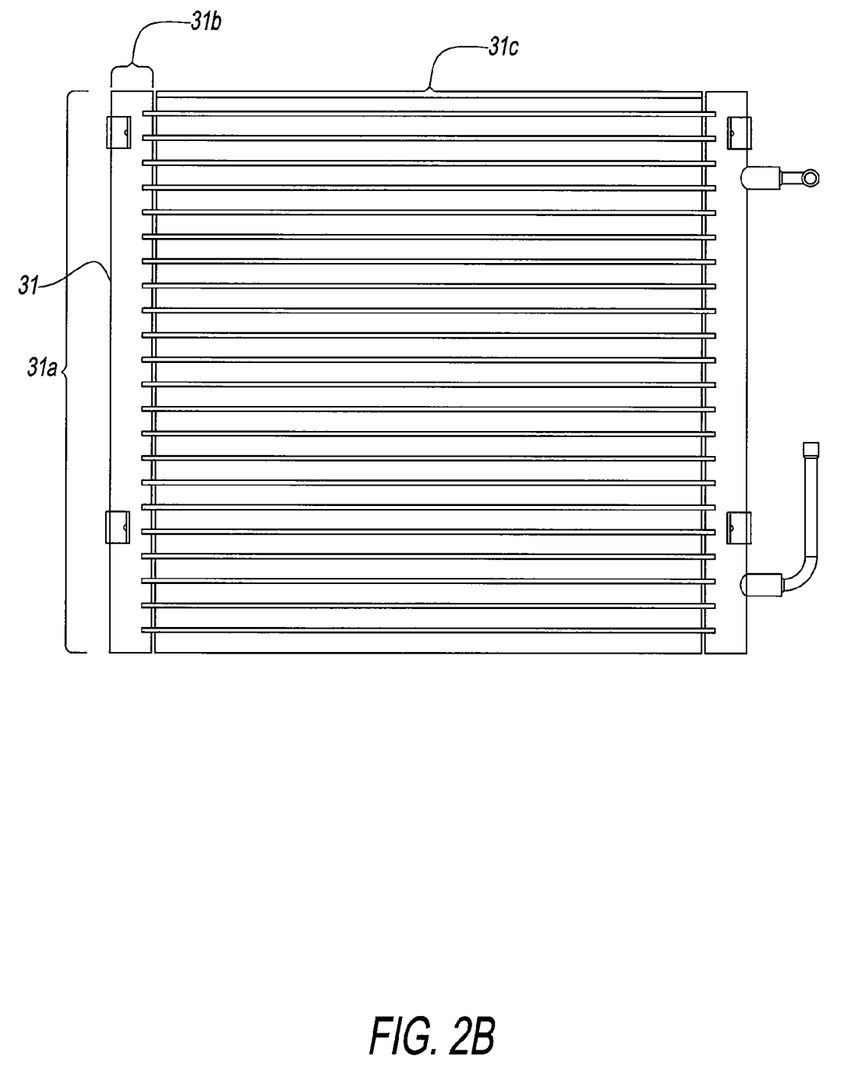
FIG. 2b is a front view of the condenser of the present disclosure.
Figure 3A:
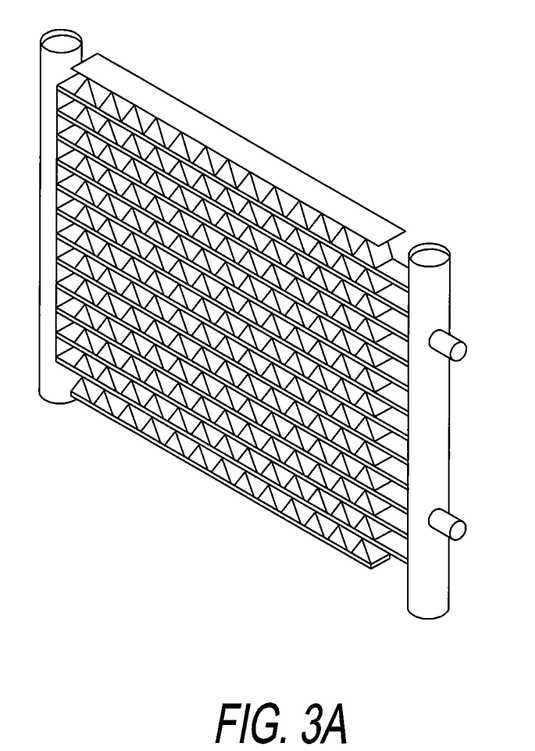
FIGS. 3a and 3b are generalized diagrams of a condenser used in typical ice making machines.
Figure 3B:
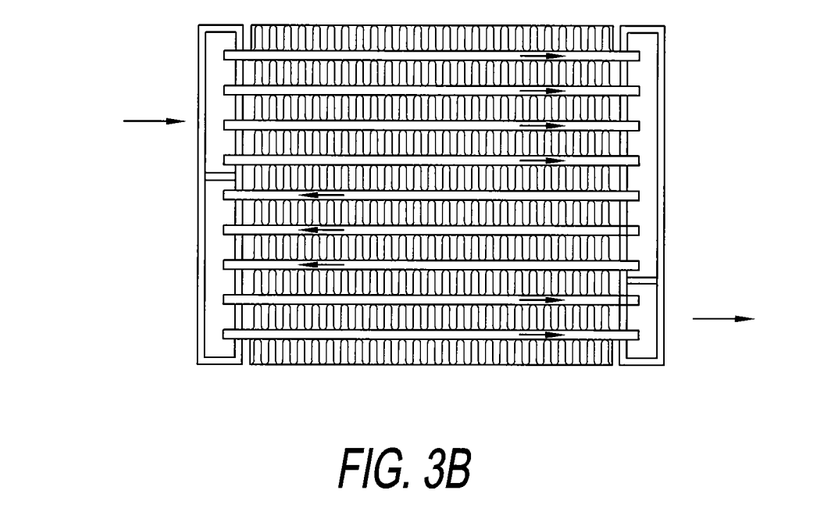
Figure 3C:
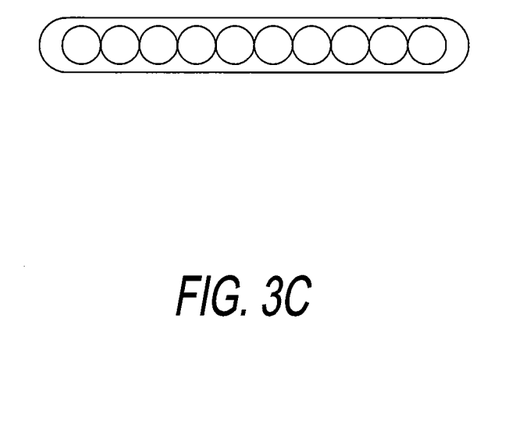
FIG. 3c is a schematic cross sectional view of a micro channel tube used in condenser FIGS. 2a and 2b.

Next, as to the condenser, a typical "stock" condenser made with copper tubes and aluminum fins, and suitable for use with HFCs, has sufficient capacity for use with HCs, such as R-290. However, the typical condenser does hold a lot of refrigerant in its liquid phase. Under the International IEC 60335-2-40 Standards, the system charge size for R-290 is limited to one that will not allow leakage of more than 150 grams if a failure occurred. Therefore, it was decided to use a micro-channel condenser which holds less liquid refrigerant. To further reduce the amount of R-290 refrigerant required, it was decided to reduce the headers on the micro channel condensers as much as possible. A condenser for use in an ice making machine according to the present disclosure may use headers having an average internal cross-sectional diameter of from about 15 mm. to about 22 mm. and a length of from about 250 to about 350 mm. and the number of micro channels may be from about 15 to about 25. A condenser for use in an ice making machine according to the present disclosure may use micro channel tubes which have a relatively "oval" cross section, and contained therein are a plurality of micro channels each having a relatively "circular" cross section. The dimensions of the micro channel tube can vary from a "width" (i.e., the larger dimension of the oval) of about 16 mm to about 26 mm. and a "height" (i.e., the smaller dimension of the oval) of from about 1.3 mm to about 2.0 mm. The circular cross sectional dimension of the micro channels themselves can vary within each micro channel tube, but generally are of a size to fit within the "height" of the micro channel tube. Stated otherwise, the diameter of the micro channel in a micro channel tube having a height of about 2.0 mm. will be just less than 2.0 mm and the diameter of the micro channel in a micro channel tube having a height of about 1.3 mm. will be just less than 1.3 mm. A general schematic of a micro channel tube is depicted in FIG. 3c. Preferably, a condenser for use in an ice making machine according to the present disclosure when combining the dimensions of the headers (which represent the majority of the volume of the condenser overall) with the micro channels, will have an internal nominal volume of from about 100 to about 250 ml. Also, a condenser for use in an ice making machine according to the present disclosure may have between about three (3) and eight (8) passes of the micro channels between the headers. The number of fins per inch in a condenser for use in an ice making machine according to the present disclosure may vary as well, from about 17 to about 25 fins per inch. This led to development of the condenser in FIGS. 2a and 2b. Turning to the condenser of FIGS. 2a and b, in that condenser, the nominal height (31a) and inside diameter (31b) of the headers (31) are 295 mm and 20 mm, respectively. There are twenty-two (22) micro channel tubes, each tube having a nominal cross-section measurement of 16 mm×1.3 mm, and a nominal length (31c) of about 300 mm. Within the tube are micro channels of substantially circular cross section of just less than 1.3 mm. The micro channel tubes and micro channels are shown schematically in FIG. 3c. In the condenser shown in FIGS. 2a and 2b, the refrigerant makes four (4) passes from inlet to outlet, and the nominal length of each pass is approximately 300 mm. Referring to FIG. 3a, in the condenser of the present disclosure, the first pass from the inlet consists of seven (7) micro channels in a first direction, the second pass consists of seven (7) micro channels in the opposite direction to the first pass, the third pass consists of five micro (5) channels in the same direction as the first pass, and the fourth pass consists of three (3) micro channels in the same direction as the second pass. The refrigerant then exits the condenser through the outlet tube. What is meant by "passes" is schematically shown in FIG. 3b. The total volume of the condenser is approximately 0.18 liters (180 ml). The predominant percentage of volume in the condenser is found in the headers. Also, the condenser which was designed for use with R-290 refrigerant has twenty-three (23) fins per inch. The use of more fins per inch adds cooling capacity, and this allows the reduction of the number of micro-channel refrigerant passes in the condenser. In return, this combination of more fins and fewer passes reduces the amount of refrigerant needed. From the condenser, the hot liquid refrigerant passes through the dryer which also acts as a filter; this is of a configuration known to those in the art.

Next, the heated liquid refrigerant reaches the expansion valve. The function of the expansion valve is to control the refrigerant flow in the refrigeration system. The valve does this by sensing superheat. In basic terms, superheat is the temperature of a fluid above its evaporation (boiling) point. For example, if at sea level water boils at 212° F., and the temperature of the steam is 215° F., the steam is said to have 3° F. of superheat. The expansion valve controls superheat by sensing the temperature of the evaporator outlet and the pressure of the refrigerant going into the evaporator (as indicated in FIG. 1 by sensor (41)), determines the temperature at the evaporator outlet, and is superheated above the vaporization temperature for that given pressure at that instant. The expansion valve maintains the superheat setting by increasing and decreasing refrigerant flow. In an ice making machine, the evaporator temperatures are constantly changing due to the heating of the evaporator to harvest the ice, and the finished product, ice, is made directly on the evaporator. Standard expansion valves were used in the ice making machines of the examples below, except that the expansion valves had rated capacities specifically designed and developed to be used with R-290. In more detail, the model QYP0214A-251 ice making machine had a Danfoss expansion valve with a rated capacity (TR/kW) 1.1 kW/0.27TR, the model IYP0324A-251 ice making machine had a Danfoss expansion valve with a rated capacity of 1.1 kW/0.32TR, and the model IYP0504A-251 ice machine had a Danfoss expansion valve with a rated capacity (TR/kW) of 1.9 kW/0.53TR.

The refrigerant boils and gains heat from the evaporator, and cools the evaporator, as it leaves the expansion valve. As mentioned above, the ice is made directly on the surface of the evaporator. Once the now gaseous and cooled refrigerant leaves the evaporator, it is returned to the compressor to repeat the cycle. Along the way, as is often standard in the design of ice making machines, the refrigerant passes through a heat exchanger where it is warmed slightly before entering the compressor. This ensures that the refrigerant has a little more superheat than it may normally have when entering the compressor and also to ensure that the possibility of the presence of any liquid droplets in the refrigerant is minimized. Also, the refrigerant passing to the expansion valve is slightly more cooled, minimizing the possibility of vapor bubbles, and this enhances expansion valve operation.

In a separate ice harvesting cycle, at regular intervals, the heated compressed gaseous refrigerant is diverted to the evaporator. In this cycle, the heated compressed gaseous refrigerant passes through the hot gas solenoid (60). Hot gas solenoid valve sizes typically need to be increased with R-290 refrigerant since it is a less dense gas compared to, for example, R-404a. This is known to those skilled in the art. The setting on the high pressure cut-out control (70) is lowered about 100 psig (from, for example, about 450 lbs. for R-404a to about 350 lbs. for R-290) since the operating pressures in an R-290 system are lower than those in an R-404a system. Fan cycling control (80) settings, again since the operating pressures are lower with R-290 compared to R-404a, have been shifted downward about 50 psi (i.e., from "off" at about 200 psi and "on" at about 250 psi for R-404a, to "off" at about 150 psi and "on" at about 200 psi for R-290).

Finally, when using HCs, care must be taken to maximize cabinet ventilation. The European standard, i.e. the IEC Standard, mandates that for R-290, in the event of a refrigerant leak, the concentration of the flammable gas inside the cabinet can never instantaneously reach the point where it is at 75% of the point where it could explode if a spark were present (called the "LFL" for Lower Flammable Limit), and the average concentration of the flammable gas over a five minute time period cannot exceed 50% of the LFL. Therefore cabinet louvers and openings must be reviewed for maximization, and adjusted as needed, depending upon the particular installation.

Using the ice making machine of the present disclosure and particularly the reduced volume compressor of the present disclosure employing a hydrocarbon coolant/refrigerant allows for a reduction in energy use and cost as well as for maintaining the ice making capacity of standard ice making machines using standard compressors and refrigerants now in use. in particular, the ice making machines of the present disclosure allow for a reduction in energy use and costs such that the ice making machines of the present disclosure use less than about 90% of the energy of a standard ice making machine of the same general model and using conventional coolants/refrigerants, preferably less than about 85% of the energy of a standard ice making machine of the same general model and using conventional coolants/refrigerants, more preferably less than about 80% of the energy of a standard ice making machine of the same general model and using conventional coolants/refrigerants, still more preferably less than about 75% of the energy of a standard ice making machine of the same general model and using conventional coolants/refrigerants and most preferably less than about 70% of the energy of a standard ice making machine of the same general model and using conventional coolants/refrigerants, or even less. In addition to using less energy, the ice making machines of the present disclosure allow for maintaining at least about 75% of the ice making capacity of a standard ice making machine of the same general model and using conventional coolants/refrigerants, preferably allow for maintaining at least about 80% of the ice making capacity of a standard ice making machine of the same general model and using conventional coolants/refrigerants, more preferably allow for maintaining at least about 85% of the ice making capacity of a standard ice making machine of the same general model and using conventional coolants/refrigerants, most preferably allow for maintaining at least about 90% of the ice making capacity of a standard ice making machine of the same general model and using conventional coolants/refrigerants, still more preferably allow for maintaining at least about 95% of the ice making capacity of a standard ice making machine of the same general model and using conventional coolants/refrigerants, and most preferably allow for maintaining more than about 95% of the ice making capacity of a standard ice making machine of the same general model and using conventional coolants/refrigerants.

The below examples are for the purpose of more fully explaining to one of skill in the art the practice of the present disclosure. These examples are not limiting to the full scope of the present disclosure as explained above and as encompassed in the claims which follow.

The following examples compare the ice making production and energy usage of the ice making machine of the present disclosure, using an HC refrigerant (propane R-290), to the same general model of ice making machine not having the modifications taught by the present disclosure, using an HFC refrigerant (R-404a).

| Model | Refrigerant | Ref. Quantity | Hz | Ice Capacity* |
|---|---|---|---|---|
| QY0214A-161 | R-404a | 13 oz. (369 gm) | 60 | 147#/day |
| QYP0214A-251 | R-290 | 130 gm | 50 | 143#/day |
| IY0324A-161 | R-404a | 20 oz. (567 gm) | 60 | 230#/day |
| IYP0324A-161 | R-290 | 130 gm | 50 | 234#/day |
| IY0540A-161 | R-404a | 28 oz. (794 gm) | 60 | 410#/day |
| IYP0540-251 | R-290 | 140 gm | 50 | 391#/day |
| Energy usage* | | | | |
| QY0214a-161 | | 10.27 Kwh/100# ice | | |
| QYP0214A-251 | | 7.65 Kwh/100# ice | | |
| IY0324A-161 | | 7.32 Kwh/100# ice | | |
| IYP0324A-161 | | 5.67 Kwh/100# ice | | |
| IY0540A-161 | | 5.73 Kwh/100# ice | | |
| IYP0540-251 | | 4.88 Kwh/100# ice | | |

*Both ice capacity and energy usage were measured at 90° F. ambient/70° F. water.

In each case, the R-290 models were operated at 50 Hz and the R-404a models were operated at 60 Hz. The compressors and motors of 50 Hz machines run a 5/6 the speed of 60 Hz machines; thus, it would be expected that the 50 Hz machines would produce about ⅙ less ice capacity. At the same time, the 50 Hz, R-290, ice machines operated at significantly lower energy usage per 100# of ice, while producing comparable or more ice per day.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

What is claimed is:

1. An ice making machine comprising:
   a coolant/refrigerant system comprising:
      a coolant/refrigerant;
      a compressor;
      a condenser comprised of first and second headers and micro channels disposed therebetween, the condenser having a plurality of internal baffles in the first and second headers such that the coolant/refrigerant makes between about three (3) and about eight (8) passes between the first and second headers;
      an evaporator;
      an expansion device;
      a hot gas valve for directing hot gases from the compressor to the evaporator; and
      interconnecting lines therefore, wherein the coolant/refrigerant comprises a flammable hydrocarbon and the condenser has a total internal volume of between about 100 ml to about 250 ml, based upon the volume of the first and second headers and the micro channels disposed therebetween.

2. The ice making machine according to claim 1, wherein the flammable hydrocarbon coolant/refrigerant comprises propane.

3. The ice making machine according to claim 1, wherein a refrigerant leak in the system releases an amount of the flammable hydrocarbon coolant/refrigerant not greater than the amount allowed under standards set for the flammable hydrocarbon coolant/refrigerant.

4. The ice making machine according to claim 2, wherein a refrigerant leak in the system releases an amount of propane not greater than an amount for the concentration of the propane to instantaneously reach 75% of the LFL.

5. The ice making machine according to claim 2, wherein a refrigerant leak in the system releases an amount of propane not greater than an amount for the concentration of the propane to reach 50% of the LFL over a five minute time period.

6. An ice making machine comprising:
a compressor for compressing a gas coolant/refrigerant comprised of flammable hydrocarbon; and
a condenser for condensing the compressed flammable hydrocarbon refrigerant, said condenser comprising:
first and second headers;
an inlet port for receiving heated vaporous flammable hydrocarbon coolant/refrigerant from said compressor;
an outlet port for discharging condensed liquid flammable hydrocarbon coolant/refrigerant, said inlet port and said outlet port disposed in said first header; and
micro channels disposed between said inlet port and said outlet port and between said first and second header, wherein said first and second headers each has at least one internal baffle for reversibly directing the flow of the flammable hydrocarbon through said micro channels, and wherein said condenser has an internal volume of between about 100 to about 250 ml, based upon the volume of the first and second headers and micro channels disposed therebetween.

7. A condenser for use in an ice making machine for condensing a compressed hydrocarbon coolant/refrigerant, said condenser comprising:
first and second headers;
an inlet port for receiving heated vaporous flammable hydrocarbon coolant/refrigerant from said compressor;
an outlet port for discharging condensed liquid flammable hydrocarbon coolant/refrigerant, said inlet port and outlet port disposed in said first header; and
micro channels disposed between said inlet port and said outlet port and between said first and second headers, wherein said first and second headers each has at least one internal baffle for reversibly directing the flow of the flammable hydrocarbon through said micro channels, and wherein said condenser has an internal volume in said first and second header and said micro channels between from about 100 ml to about 250 ml.

8. The condenser according to claim 7, wherein said first and second headers have an average internal cross-sectional diameter of from about 15 mm to about 22 mm and a length of from about 250 mm to about 350 mm, and the number of said micro channels is from about 15 to about 25.

9. A method of substantially preventing or suppressing fire or explosion of flammable hydrocarbon coolant/refrigerant in the event of leakage of said flammable hydrocarbon coolant/refrigerant from a condenser, said method comprising;
filling a condenser with said flammable hydrocarbon coolant/refrigerant, said condenser comprising:
first and second headers;
an inlet port for receiving heated vaporous hydrocarbon coolant/refrigerant from said compressor;
an outlet port for discharging condensed liquid hydrocarbon coolant/refrigerant, said inlet port and said outlet port disposed in said first header; and
micro channels disposed between said inlet port and said outlet port and between said first and second headers, wherein said first and second headers each has at least one internal baffle for reversibly directing the flow of the flammable hydrocarbon through said micro channels, and wherein said condenser has an internal volume in said first and second header and said micro channels between from about 100 ml to about 250 ml.

10. The method according to claim 9, wherein the flammable hydrocarbon coolant/refrigerant comprises propane.

11. The method according to claim 10, wherein a refrigerant leak in the system releases an amount of propane not greater than an amount for the concentration of the propane to instantaneously reach 75% of the LFL.

12. The method according to claim 10, wherein a refrigerant leak in the system releases an amount of propane not greater than an amount for the concentration of the propane to reach 50% of the LFL over a five minute time period.

13. A method of maintaining the ice making capacity while simultaneously reducing the energy use of an ice making machine, said method comprising:
using a condenser comprising:
first and second headers;
an inlet port for receiving heated vaporous flammable hydrocarbon coolant/refrigerant from said compressor;
an outlet port for discharging condensed liquid flammable hydrocarbon coolant/refrigerant, said inlet port and said outlet port disposed in said first header; and
micro channels disposed between said inlet port and said outlet port and between said first and second headers, wherein said first and second headers each has at least one internal baffle for reversibly directing the flow of the flammable hydrocarbon through said micro channels, and wherein said condenser has an internal volume in said first and second header and said micro channels between from about 100 ml to about 250 ml.

14. The method according to claim 13, wherein the flammable hydrocarbon coolant/refrigerant comprises propane.

15. The method according to claim 14, wherein the ice making capacity is maintained to at least about 75% of, and the energy use to less than about 90% of, an ice making machine having a condenser with an internal volume in its headers and channels above about 300 ml and using HFC coolants/refrigerants.

* * * * *